United States Patent [19]

Shah

[11] Patent Number: 5,761,450
[45] Date of Patent: Jun. 2, 1998

[54] BUS BRIDGE CIRCUIT FLUSHING BUFFER TO A BUS DURING ONE ACQUIRE/RELINQUISH CYCLE BY PROVIDING EMPTY ADDRESS INDICATIONS

[75] Inventor: Nilesh Shah, Folsom, Calif.

[73] Assignee: Intel Corporation, Santa Clara, Calif.

[21] Appl. No.: 784,138

[22] Filed: Jan. 15, 1997

Related U.S. Application Data

[63] Continuation of Ser. No. 201,818, Feb. 24, 1994, abandoned.

[51] Int. Cl.$^6$ ................................................ G06F 13/14
[52] U.S. Cl. .................... 395/287; 395/308; 395/854; 395/875; 364/229.2; 364/240.2; 364/242.92; 364/940.2
[58] Field of Search ........................... 395/287, 308, 395/854, 875; 364/229.2, 240.2, 242.92, 940.2; 370/402, 911

[56] References Cited

U.S. PATENT DOCUMENTS

| | | | |
|---|---|---|---|
| 5,123,091 | 6/1992 | Newman | 395/200 |
| 5,233,702 | 8/1993 | Emma et al. | 395/425 |
| 5,255,374 | 10/1993 | Alderaguia et al. | 395/325 |
| 5,265,211 | 11/1993 | Amini et al. | 395/325 |
| 5,426,740 | 6/1995 | Bennett | 395/325 |
| 5,434,996 | 7/1995 | Bell | 395/550 |
| 5,448,704 | 9/1995 | Spaniol et al. | 395/310 |
| 5,450,551 | 9/1995 | Amini et al. | 395/299 |

Primary Examiner—Thomas C. Lee
Assistant Examiner—Ki S. Kim
Attorney, Agent, or Firm—Blakely, Sokoloff, Taylor & Zafman

[57] ABSTRACT

A bridge circuit adapted to be associated with a first faster bus circuit and a second slower bus circuit which bridge circuit includes a first path for transferring data between the first and second buses including a plurality of individual buffers each capable of storing a plurality of separately addressed increments of data destined for a plurality of sequential addresses, apparatus for storing data in the buffers at addresses provided by a bus master on the second bus, apparatus for detecting when data in a buffer is ready to be transferred to the first bus, apparatus for flushing any buffer which contains data ready to be transferred to the first bus, and apparatus for transferring data from the second bus to another of the plurality of buffers when a first buffer contains data ready to be transferred to the first bus until all of the buffers contain data ready to be transferred to the first bus

23 Claims, 7 Drawing Sheets

FIG. 2

FIG_4

| NO. | D3 | D2 | D1 | D0 | FLUSH VALUE |
|---|---|---|---|---|---|
| 1 | | | | | 0 |
| 2 | | | | ▓ | 1 |
| 3 | | | ▓ | | 1 |
| 4 | | | ▓ | ▓ | 2 |
| 5 | | ▓ | | | 1 |
| 6 | | ▓ | | ▓ | 3 |
| 7 | | ▓ | ▓ | | 2 |
| 8 | | ▓ | ▓ | ▓ | 3 |
| 9 | ▓ | | | | 1 |
| 10 | ▓ | | | ▓ | 4 |
| 11 | ▓ | | ▓ | | 3 |
| 12 | ▓ | | ▓ | ▓ | 4 |
| 13 | ▓ | ▓ | | | 2 |
| 14 | ▓ | ▓ | | ▓ | 4 |
| 15 | ▓ | ▓ | ▓ | | 3 |
| 16 | ▓ | ▓ | ▓ | ▓ | 4 |

FIG_5

FIG_6

BUS BRIDGE CIRCUIT FLUSHING BUFFER TO A BUS DURING ONE ACQUIRE/ RELINQUISH CYCLE BY PROVIDING EMPTY ADDRESS INDICATIONS

This is a continuation of application Ser. No. 08/201,818 filed Feb. 24, 1994, now abandoned.

BACKGROUND OF THE INVENTION

1. Field of the Invention

This invention relates to computer systems, and more particularly, to methods and apparatus for accelerating the transfer of data in a computer system utilizing multiple buses.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Architecture (ISA) bus or an Expanded Industry Standard Architecture (EISA) bus. The ISA bus is a sixteen bit data bus while the EISA bus is thirty-two bits wide. Each of these buses functions at a frequency of eight megahertz. These bus widths and the rates at which each of these buses is capable of operating have been found limiting so there have been a number of attempts to increase the bus speed.

One recently implemented method of increasing the bus speed is to provide an additional, so called, "local bus" which is more closely associated with the central processor than either of the above-mentioned buses and which is capable of running at speeds that more closely approximate the speed at which the processor itself runs. Those system components which require faster operation than has been available using the slower buses (such as a graphics card for an output display device) are joined to this faster local bus. However, it is most desirable to be able to continue to utilize those components which were designed to operate with the older buses and which operate at a slower rate. In order to do this, the slower ISA or EISA bus is continued in an essentially unchanged form; and those components which are able to tolerate longer access times are associated with the slower bus. It is then necessary to provide arrangements by which data may be transferred between all of the computer system components. This requires complicated interfacing arrangements. Although the theory behind using a local bus is good, many local bus designs have created conflicts in accessing components which actually slow the operation of the computer.

Intel Corporation has designed a new local bus which may be associated in a computer system with other buses such as an ISA bus or an EISA bus (which are hereinafter referred to broadly as secondary buses). This new local bus provides faster throughput of data for selected components of the system without the conflicts which arise using other local bus systems. This new bus is referred to as the "peripheral component interconnect" (PCI) bus. A computer system using this PCI bus includes in addition to the physical PCI bus a first bridge circuit which provides the interface and controls the transfer of data among the PCI bus, the central processing unit, and main memory. A second bridge circuit is also provided as an interface between and a control for the transfer of data between the secondary bus and the PCI bus. Thus, the arrangement is such that components on the PCI bus transfer data to and receive data from main memory through the first bridge which joins to the central processor and to the main memory; while components on the secondary bus transfer and receive data through the second bridge and through the PCI bus for transfers with components on the PCI bus, and through the second and first bridges and the PCI bus for transfers with the central processor and the main memory.

Various designs of secondary bridges have been proposed. Specific embodiments of such bridges are described in detail in a publication entitled 82420/82430 *PCIset, ISA and EISA Bridges*, 1993, Intel Corporation. The design of these bridges is complicated by various factors. For example, each of the PCI and secondary buses is designed with controlling rules of operation which must be adhered to in designing a bridge to connect the two disparate buses. The PCI bus has been designed as a thirty-two bit bus. The PCI bus joins to the central processing unit and main memory through the first bridge circuit which is designed to buffer transfers of data so that a faster processor need not slow to the speed of the bus in transferring data. Because of this buffering arrangement, it is a requirement that write operations on the PCI bus be completed before any read operation of memory is allowed so that the coherency of the buffered write data is maintained when a write operation is interrupted. This requires that write data stored in buffers in each of the first and second bridges be flushed to its destination before the read process can commence. For many other similar reasons, flushing the data buffers of the bridges is required.

On the other hand, the secondary buses were designed without buffered transfers in mind. Once a bus master on one of these secondary buses gains access to the bus, it cannot be forced to relinquish its access. Consequently, if that access extends to the PCI bus (for example, to write to main memory), then the PCI bus will also be owned by the secondary bus master and will lose its speed advantage. Because of the different bus protocols the transfer of data by a bridge has been found to be very complicated. Since the difference in protocols has been found to provide a large number of instances in which buffer flushing must be accomplished, it is desirable to provide a bridge arrangement between the PCI and secondary buses which accomplishes data transfers in a most expeditious manner when flushing is required while adhering to the protocols of both of the buses to which is joined.

SUMMARY OF THE INVENTION

It is, therefore, an object of the present invention to provide an improved bridge circuit capable of rapidly transferring data and addresses between buses in a multiple busing system while maintaining the protocols of the buses.

It is another more specific object of the present invention to provide an improved bridge circuit capable of rapidly transferring data and addresses to and from both a PCI bus and a secondary bus in a multiple busing system when flushing is required.

These and other objects of the present invention are realized in a bridge circuit adapted to be associated with a first faster bus circuit and a second slower bus circuit which bridge circuit includes a first path for transferring data between the first and second buses, the first path including a plurality of individual buffers each capable of storing a plurality of separately addressed increments of data destined for a plurality of sequential addresses, means for storing data in the buffers at addresses provided by a bus master on the second bus, means for detecting when data in a buffer is ready to be transferred to the first bus, means for flushing any buffer which contains data ready to be transferred to the first bus, and means for transferring data from the second bus to another of the plurality of buffers when a first buffer contains data ready to be transferred to the first bus until all of the buffers contain data ready to be transferred to the first bus.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
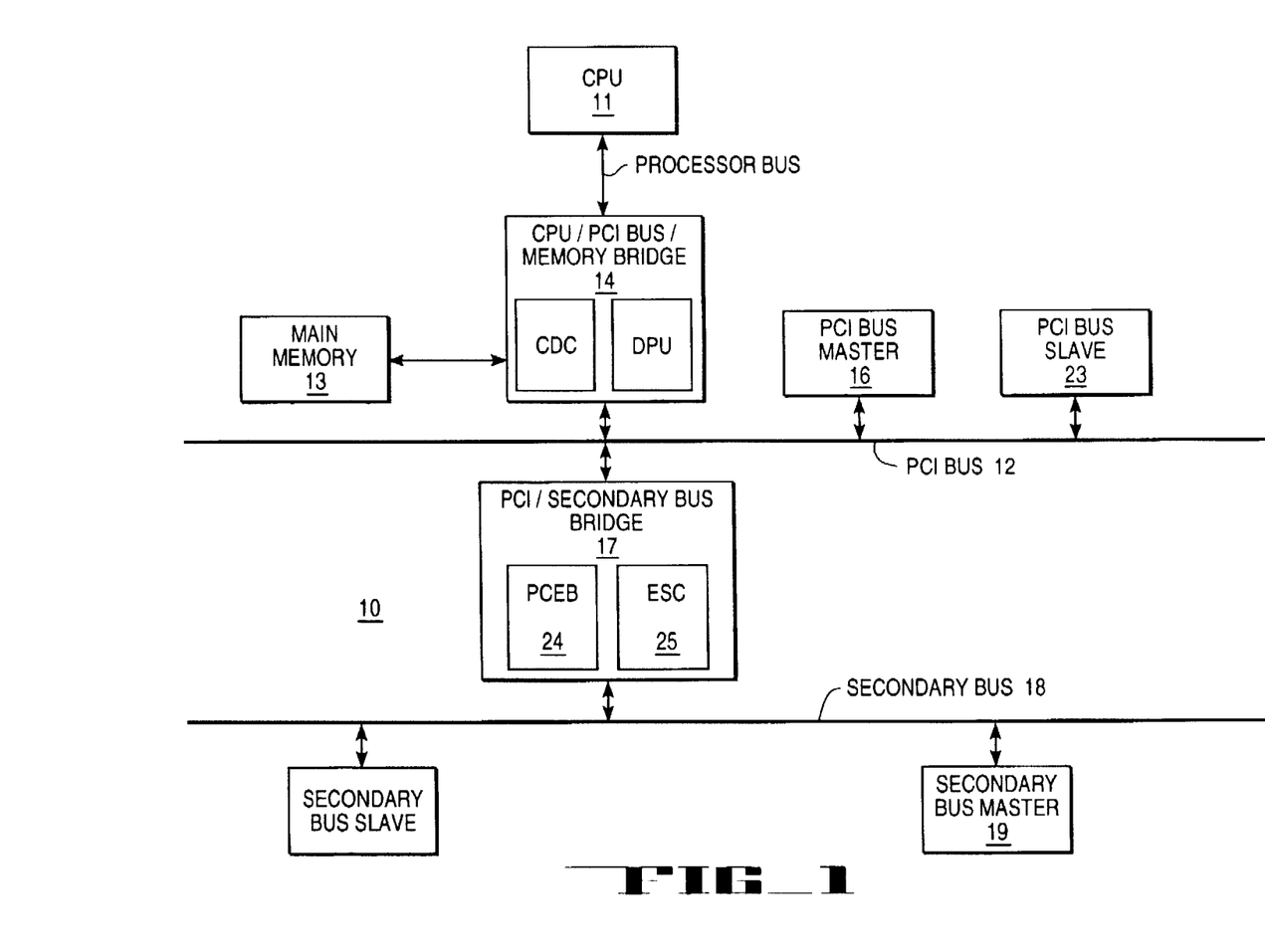
FIG. 1 is a block diagram of a computer system including a plurality of buses including at least a PCI bus and a secondary bus.

Referring now to FIG. 1, there is illustrated a computer system 10. The system 10 includes a central processor 11 such as an Intel i486™ or other microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 may be physically constructed to include both a cache and dram controller (CDC) chip and a data path unit (DPU) chip each of which is manufactured by Intel Corporation of Santa Clara, Calif. Detailed descriptions of these chips are provided in publications entitled *Cache & DRAM Controller (CDC) 82424TX* and *Data Path Unit (DPU) 82423TX*, each published by Intel Corporation. The bridge 14 includes circuitry for interfacing the CPU 11 and main memory 13 to the bridge 14, circuitry for interfacing the bridge 14 to the PCI bus 12 as either a bus master or a bus slave, and cache control and data synchronization circuitry. In general, the bridge circuit 14 includes circuitry for controlling and accomplishing the transfer of data among the CPU 11, main memory 13, and the PCI bus 12. Among the circuitry included in the bridge 14 and specifically in the DPU are a number of buffer circuits in which data may be stored during transfer among the CPU 11, main memory 13, and the PCI bus 12. For example, write buffers in the DPU allow the CPU 11 to store data being transferred to the PCI bus 12 and continue with other operations while the bridge circuit 14 completes the transfer of the write data to the slower PCI bus 12. This greatly improves the speed of data transfer in the computer system 10 when using a high speed central processing unit.

Also connected to the PCI bus 12 is a PCI bus master circuit 16 which may be one of a number of different components. From a bus standpoint, the main properties of a PCI bus master are that it includes a microprocessor or controller which functions at some internal clock rate and that it may initiate and control operations on the PCI bus 12. Also connected to the PCI bus 12 is a PCI slave circuit 23 which may be a circuit such as a video output card having a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus, an EISA bus, or a similar bus, any of which typically transfers data at a rate slower than the bus 12. One specific PCI to secondary bridge circuit 17 used with an EISA secondary bus includes a pair of integrated circuit chips referred to respectively as a PCI/EISA bridge (PCEB) 24 and an EISA System Controller (ESC) 25. These integrated circuit chips are manufactured by Intel Corporation and are described in detail in the publication entitled 82420/82430 *PClset, ISA and EISA Bridges*, referred to above. In general, the PCEB chip 24 includes circuitry for transferring data between the two buses, while the ESC chip 25 includes circuitry for controlling access to the secondary bus.

Such a bridge 17 includes circuitry for providing the interface between the PCI bus 12 and the secondary bus 18 so that data may be transferred therebetween. Among this circuitry are a number of data buffers adapted to store data being transferred between the two buses. To facilitate the data transfer, the bridge 17 provides circuitry generally in the PCEB chip 24 which allows it to operate as an intercoupling bus master or a bus slave on the PCI bus 12. The bridge 17 also provides circuitry generally in the ESC chip 25 which allows it to operate as an bus master or a bus slave on the secondary bus 18. The ability of the bridge 17 to act as a PCI bus master and a secondary bus slave allows a bus master circuit 19 positioned on the secondary bus 18 (for example, local area network circuitry) to gain access to the PCI bus 12 and thence to the main memory. The bridge 17 may also include a first arbiter circuit for controlling access to the PCI bus 12 and a second arbiter circuit for controlling access to the secondary bus 18.

Figure 2:
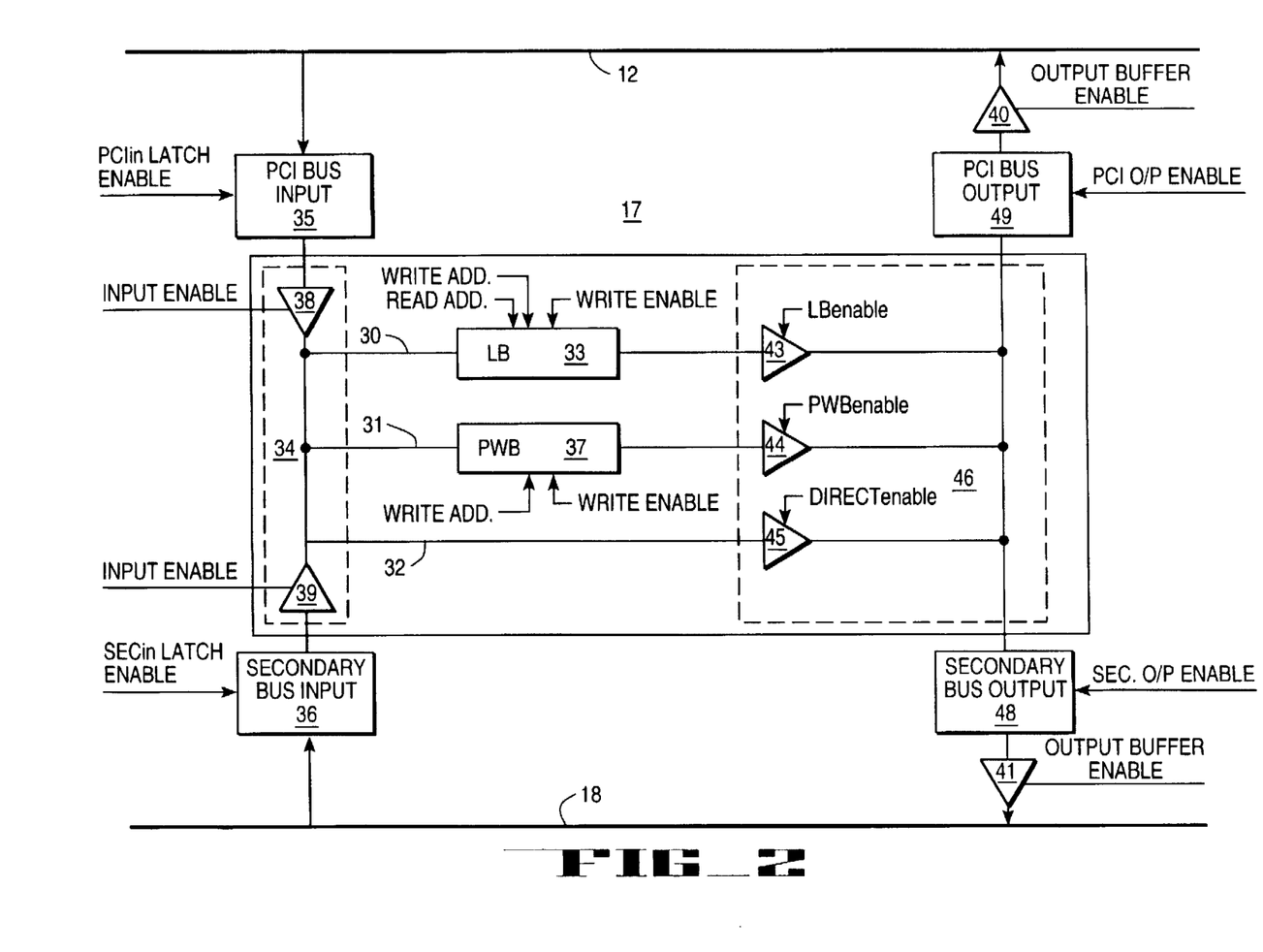
FIG. 2 is a block diagram of the data transfer paths of a bridge circuit illustrated in FIG. 1 for connecting a PCI bus and a secondary bus in accordance with the present invention.

Referring now to FIG. 2, there is illustrated a block diagram of a data transfer portion in one embodiment of a bridge circuit 17 such as that illustrated in FIG. 1 which is designed in accordance with the present invention to accomplish the transfer of data between the two buses 12 and 18 of the computer system. It should be noted that in one embodiment of the bridge circuit 17 with which the present invention is utilized an essentially identical address transfer portion is utilized for transferring addresses between the buses 12 and 18. From this point on, the description may be considered to explain the operation of both data and address transfer portions. The data transfer circuitry of the circuit 17 includes three individual paths which may transfer data between the PCI bus 12 and a secondary bus 18. The first of these three paths 30 includes a line buffer 33 (a plurality of individual buffers in one embodiment) in which data may be stored which is being transferred during read and write operations. Typically data is stored in this buffer when a read transfer is being accomplished from the faster to the slower bus, i.e., when the slower secondary bus is reading from the PCI to the secondary bus or when a write operation is being accomplished from the slower to the faster bus. The second path 31 includes a posted write buffer 37 in which data being written from the faster to the slower bus is typically stored. The third path is essentially a direct connection 32 for information which need not (or may not) be stored during transfer between the buses. This third path 32 allows data to be taken directly from memory and transferred to the secondary bus without buffering.

Each of these three paths is connected to receive input data transferred by a multiplexor 34. In the figure (which represents only one possible embodiment of the circuitry), the multiplexor 34 is represented by a pair of tristate devices 38 and 39 which may be enabled to allow input from either of the buses. The multiplexor 34 receives input signals from input latches 35 and 36 connecting to each of the two buses 12 and 18 under control of enabling signals furnished when a particular bus master gains access to the bus and the bridge circuitry. Only one of the two buses may transfer signals at any instant. Consequently, only one of the inputs to the multiplexor 34 from the latches will be selected at any time. Each of the three paths is also connected to provide outputs to a pair of output buffer circuits 40 and 41 which, may be enabled to transfer the data to either the secondary bus 18 or the PCI bus 12. Consequently, any amount of data may be sent from either the PCI bus or the secondary bus to the other one of the two buses through any of the paths without having to transit any significant circuitry or gating which might require significant clock delays in the transfer.

As may be seen, each of the three paths includes a tristate device 43, 44, or 45 which when enabled allows the transfer data through that particular path from the sending bus to the receiving bus. Each of the two paths which includes storage buffers 33 or 37 also includes circuitry for furnishing control signals to enable that buffer so that the correct storage buffer and path may be selected for the particular read and write operation which is taking place. It should be noted that the three tristate devices 43, 44, or 45 are one embodiment of what may be considered to be a multiplexor 46 to a single output path leading to each of the two buses 12 and 18. As has been set out above, the buses historically used with Intel microprocessors in computer systems (ISA and EISA buses) do not run as fast as is desirable. For this reason, the new PCI bus has been designed to run at a speed closer to the speed of the processors This has been accomplished by utilizing a bus width of at least thirty-two bits for the PCI bus, increasing the allowable frequency of operation, and providing buffering so that components (such as a CPU 11) operating at a higher data transfer rate than the PCI bus 12 may store data in the bridge and continue with other operations while the bridge completes the transfer of stored data.

Buffering also offers substantial advantages at bridges (such as the bridge circuit 17) which provide an interface between a slower bus and the PCI bus. For example, when a faster bus is trying to write to a slower bus without buffering, the speed of the transfer necessarily slows to the speed at which the slower bus can accept the data. When transferring in the other direction from the slow bus, the speed of transfer to the faster bus can only approach the speed at which the components on the slower bus are able to transfer data. By allowing the accumulation of data furnished by slower components in bridge buffers, data transfer to the faster bus may take place at a rate which does not slow the faster bus For this reason, the bridge 17 has also been designed to utilize buffers so that either bus may store data being transferred for later transfer at a rate at which the accepting bus can receive the data.

As is illustrated in FIG. 1, the PCI bus has been integrated into computer systems along with the older buses so that components designed for the older buses may continue to be used. A number of problems have arisen in attempting to integrate buses designed with substantially different protocols into the same computer system. For example, one problem which has arisen with integrating the newer PCI bus into a computer system with either of the older secondary buses is that each of these older buses was designed in a manner that a bus master on that older bus which gains access to the bus owns the bus until it has completed its operation. It cannot be forced off of the bus.

On the other hand, the new bus was designed so that transfers of data could be accomplished as rapidly as possible. The new PCI bus has provisions which allow for interruptions by other operations. This is accomplished by buffering the operations on the PCI bus, and by certain PCI protocol signals which allow retry and similar operations. One consequence of the buffering is a protocol which requires that write operations to memory on the PCI bus be completed before read operations of the same memory locations are allowed so that data coherency is maintained. For example, when data which is being written by the CPU 11 to the PCI bus 12 is buffered in the bridge 14 and the write of the last increment of data to the buffer is completed, the CPU 11 typically sets a valid flag in memory for other components to read. Until the write of the data in the buffer is completed to its final destination, another component may read the flag and assume the data at the addressed position is valid even though some portion of that data remains in the buffer. This requirement that write operations be completed before reads of main memory necessitates that write data in the write buffers in the bridge 14 and the bridge 17 be flushed to its addressed destination before any read of main memory occurs. A number of other situations arise in which buffers in the bridges 14 and 17 should be flushed before some other operation occurs. For example, in a typical configuration, the line buffer 33 illustrated in FIG. 2 includes four individual buffers each capable of holding four doublewords of data. To enhance transfer speed, the line buffer 33 should be flushed whenever any one of the set of four buffers is completely filled. To maintain data coherency, it should also be flushed whenever the highest numbered doubleword space of any one of such buffers is filled, whenever a transfer through the line buffer 33 ceases in favor of a transfer through the direct path 32 or vice versa, whenever the ownership of the secondary bus 18 changes, whenever an interrupt is encountered necessitating a flush, and whenever a write access by a bus master encounters a write miss. As will be understood, many of these occurrences signal the end of one operation and the beginning of another.

When operating with these older buses, the PCI bus and its interfacing circuitry must be adapted to allow, as well as possible, the operations of the older buses to continue while still maintaining its own speed and integrity. As pointed out above, the secondary buses and components which join thereto were designed so that a bus master which gains access to the secondary bus retains control of that bus until it has completed its operations and then relinquishes the bus to some other component. So long as secondary bus masters are only transferring data on the secondary bus, this is not a problem. However, a secondary bus master such as a DMA device will often need to read or write data from or to main memory. To do this, the secondary bus master must use the PCI bus master abilities of the bridge 17 to gain access to the PCI bus 12. However, because a bus master on the ISA and EISA buses cannot be forced off the bus until it has completed its operations, once a bus master on the EISA bus owns both the EISA bus and the PCI bus at the same time, it cannot be forced off the PCI bus. This precludes other PCI components from gaining access to the PCI bus and thus eliminates the speed advantages which the PCI bus offers.

Figure 3:
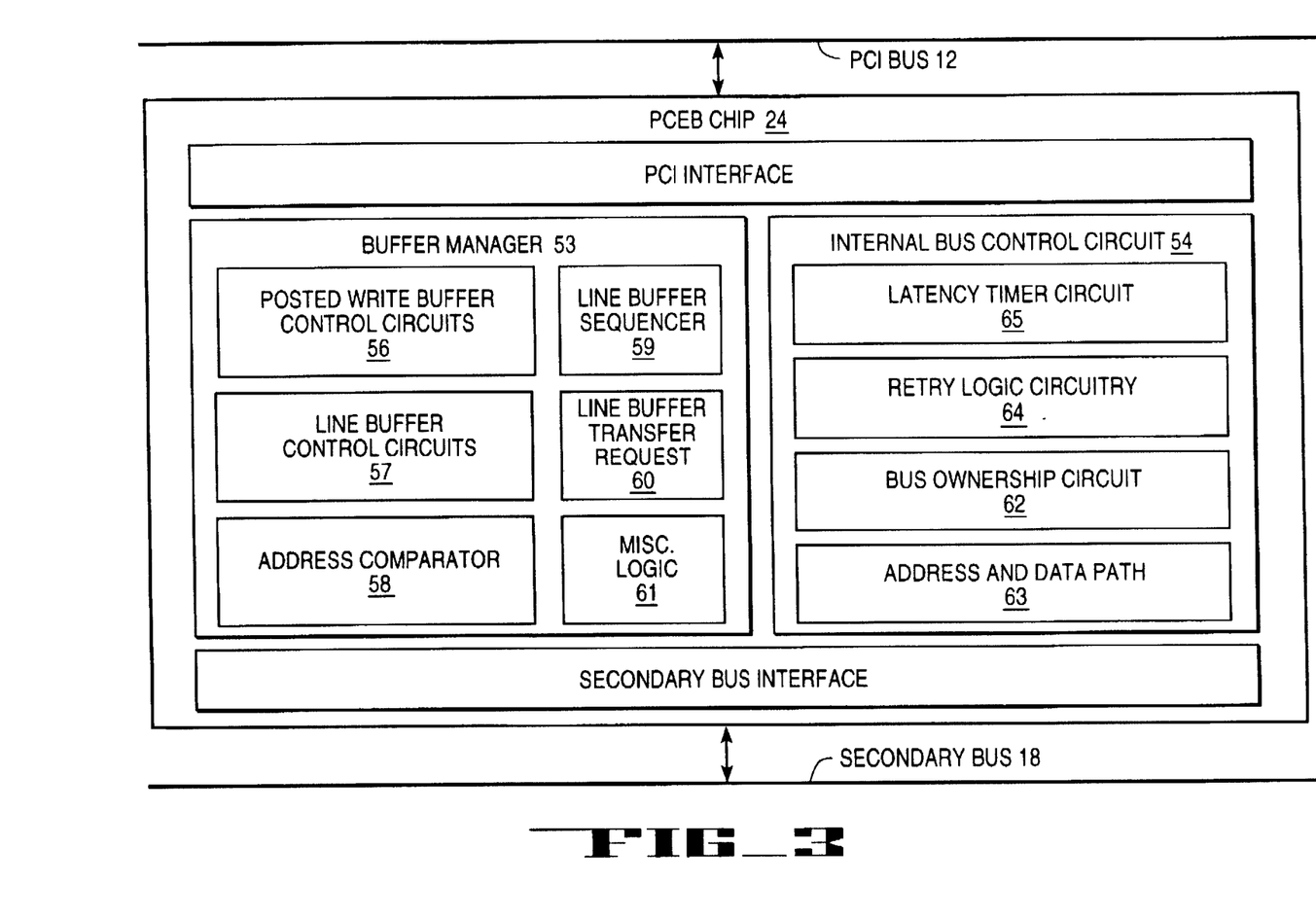
FIG. 3 is a block diagram of control circuitry used in the bridge circuit illustrated in FIG. 1 for connecting a PCI bus and a secondary bus in accordance with the present invention.

For this reason, it is important to utilize an operating scheme by which transfers of data to the PCI bus 12 using the buffers in the bridge 17 may be optimized to allow the PCI bus to operate most efficiently without penalizing the components on the secondary bus. FIG. 3 illustrates in block form a functional block diagram of the control circuitry of the PCEB chip 24 of the bridge circuit 17. As may be seen in FIG. 3, PCI interface circuitry is arranged to provide an interface for transferring data and addresses to and from the PCI bus. In a similar manner, secondary bus interface circuitry is arranged to provide an interface for transferring data and addresses to and from the secondary bus (e.g. an EISA bus). Within the PCEB chip 24 are arranged a buffer manager circuit 53 and an internal bus control circuit 54. The buffer manager 53 includes control circuitry 56 including state machines for causing the operation of posted write buffers 37; control circuitry 57 including state machines for causing the operation of line buffers; address comparator circuitry 58 for controlling selection of particular buffers and bytes, word, and double word portions of individual buffers; a line buffer sequencer 59 which aids in controlling sequencing through the line buffers 33; a line buffer transfer request circuit 60; and various miscellaneous logic 61. The internal bus control circuitry 54 includes a bus ownership control logic circuit 62 which incorporates logic including state machines for determining at any time the ownership of the various data paths through the PCEB chip 24. The circuitry 54 also includes the address and data paths 63 including the physical line buffers 33 and posted write buffers 37 illustrated in FIG. 2 above. A retry logic circuit 64 with a number of state machines which track the status of the various components of the bridge 17 and the condition of the buses and an EISA latency timer circuit 65 are also a part of the internal bus control circuit 54.

Figure 4:
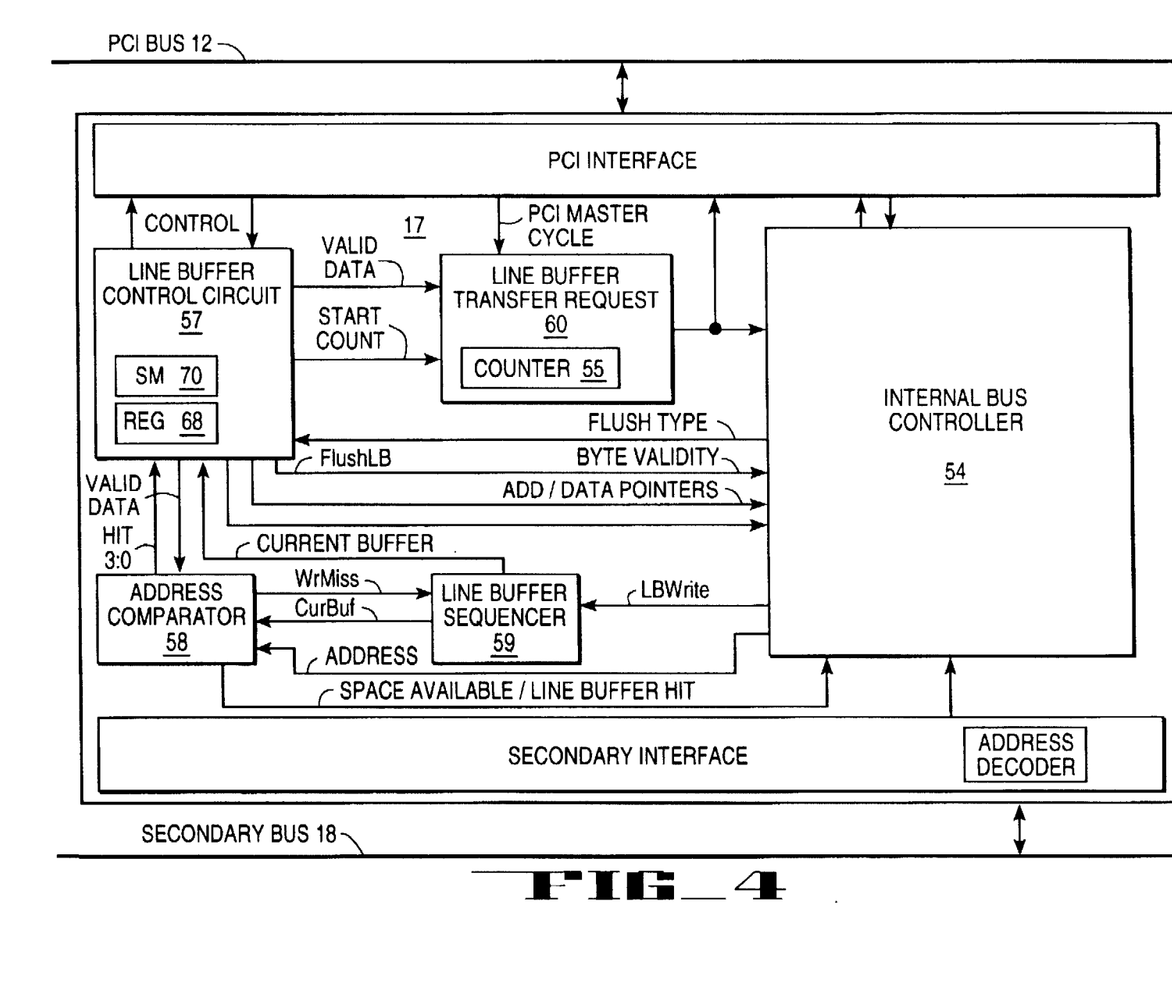
FIG. 4 is a more detailed block diagram of a portion of the control circuitry illustrated in FIG. 3.

FIG. 4 is a block diagram of that portion of the control circuitry of the bridge 17 illustrated in the previous figures used in carrying out the present invention. The bridge circuit 17 includes the line buffer control circuit 57 for furnishing control signals to operate the line buffers 33 so that those buffers may be connected to receive data from the secondary bus 18 and transfer that data to components on the PCI bus 12. The line buffer control circuit 57 is arranged to control the operations of the line buffers 33 in accordance with the present invention. The line buffer control circuit 57 receives control signals from the PCI interface circuit, the internal bus controller 54, the address comparator 58, and the line buffer sequencer circuit 59. The line buffer control circuit 57 transfers signals to the line buffer transfer request circuit 60, to the internal bus controller 54, and the PCI interface. A counter circuit 55 which is a portion of the line buffer transfer request circuit 60 is arranged to receive signals from the line buffer control circuit 57 and store a count of the number of data doublewords in a line buffer which is presently being utilized to store data. The counter circuit 55 provides a count which is transferred as a control signal indicating this value to the PCI interface circuit 53 and to the internal bus controller 54. The PCI interface uses these signals to determine the amount of data yet to be transferred by the circuitry of the bridge 17 from the particular line buffer 33 which is currently transferring data.

The internal bus controller 54 transfers signals to the PCI interface circuitry, the line buffer control circuit 57, the line buffer sequencer 59, and the address comparator 58. The line buffer sequencer 59 receives signals from the address comparator 58 indicating an address hit or miss and provides to the address comparator a next line buffer in the sequence of individual line buffers 33 for data each time a buffer is filled. The address comparator 58 compares the most significant bits of the address on the secondary bus 18 for incoming data with the current line buffer address furnished by the line buffer sequencer 59 and determines whether space is available for data in the current line buffer. The address comparator 58 uses the signals from the line buffer sequencer 59 to transfer control signals to the line buffer control circuit 57 pointing to the appropriate individual line buffer for storing the current data.

Figure 6:
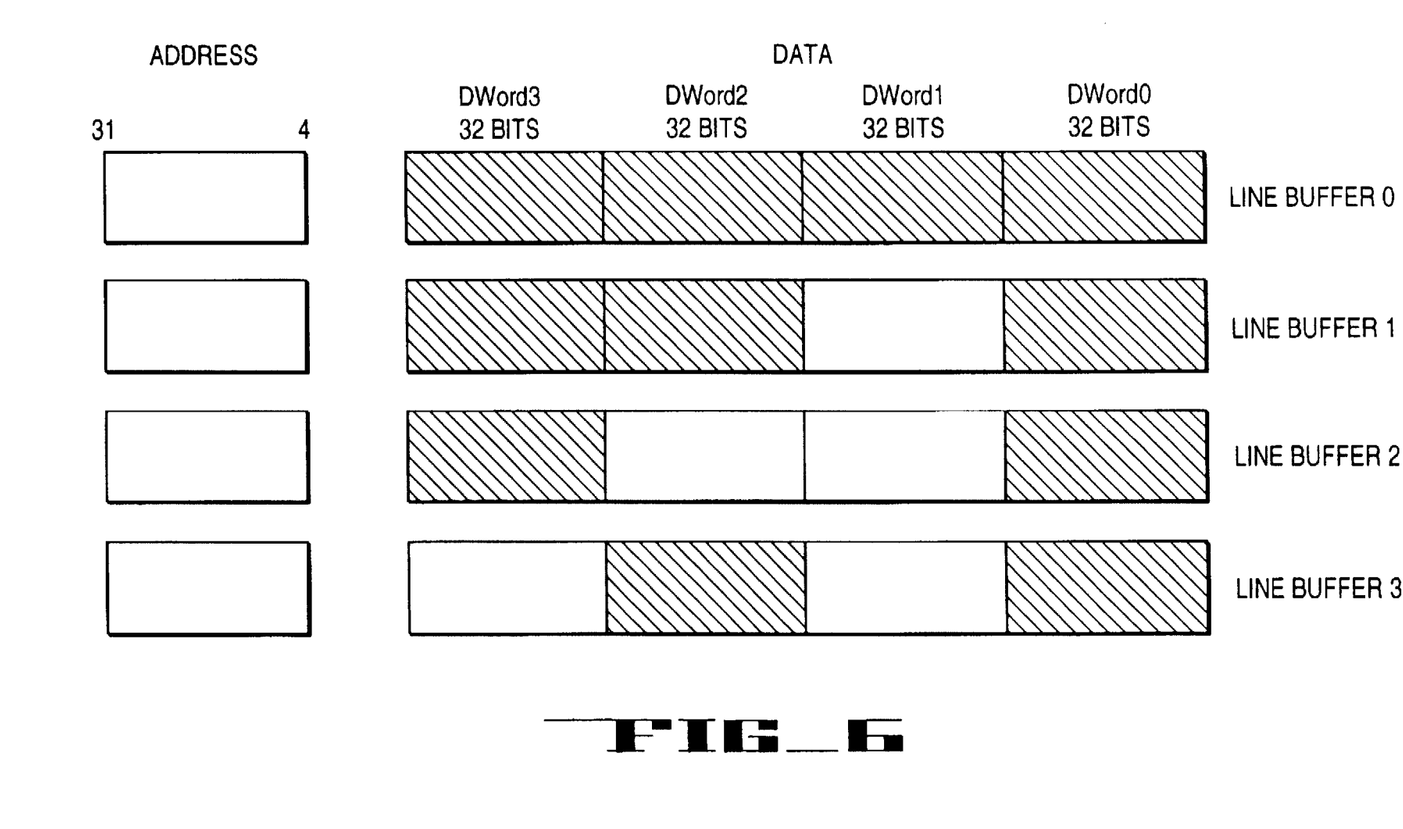
FIG. 6 is a diagram illustrating in more detail the line buffers of the bridge circuit shown in FIG. 2.

In operation, when a bus master such as a DMA controller on the secondary bus 18 transfers data to a component on the PCI bus 12, the bus master arbitrates for access to the secondary bus. When the bus master gains access to the secondary bus 18, it begins to transfer data to the bridge circuit 17. Presuming that there is room in the line buffers 33, the data is transferred to the buffers 33 in increments equivalent to whatever the component is capable of transferring. For example, an EISA bus master might be capable of transferring thirty-two bits of data (one doubleword) at once to the line buffers. In order to facilitate the economic transfer of data, the data is allowed to accumulate in the buffers 33 until an amount sufficient for economic transfer to the PCI bus 12 has accumulated. In one embodiment, this amount is equivalent to one line buffer capable of holding four doublewords of data. When this amount has accumulated, then all of the data in that particular one of the four line buffers which make up the line buffer 33 is transferred from the line buffer to the PCI bus 12. By accumulating data in a line buffer and transferring it when the buffer is loaded, the rate of transfer to the PCI bus 12 is maximized while a sufficient number of the individual four line buffers are left to receive data still to be transferred. This allows the secondary bus master to operate at its maximum rate in filling the buffers 33 and not have to wait for individual line buffers to be flushed. FIG. 6 illustrates a particular embodiment for the line buffers 33 in accordance with the present invention. As may be seen, the circuit of the present invention includes four individual data line buffers (identified as buffers 0–3) each of which may include a total of sixteen bytes of data storage space, room for storing a total of four double words per individual buffer. In that same embodiment, each data line buffer has a thirty-two bit address associated with it which is transferred by the address line buffer mentioned above. The twenty-eight most significant bits of the address are used to indicate the particular data line buffers and address line buffer in which data and addresses are stored, while the next two least significant bits of the address (bits 3:2) indicate the particular doubleword space for data within a line buffer.

Depending on the physical size of the bus master furnishing data to the line buffers, the buffers may be filled in data increments of eight bits, sixteen bits, or thirty-two bits. While a DMA controller will typically read data from a slave component in sequential doublewords, a bus master of some other type (e.g., a local area network controller) may transfer data from non-sequential addresses to the buffers 33. For this reason among others, at any particular time, the data in the buffers 33 may be stored in any of a number of sixteen different patterns.

Figure 5:
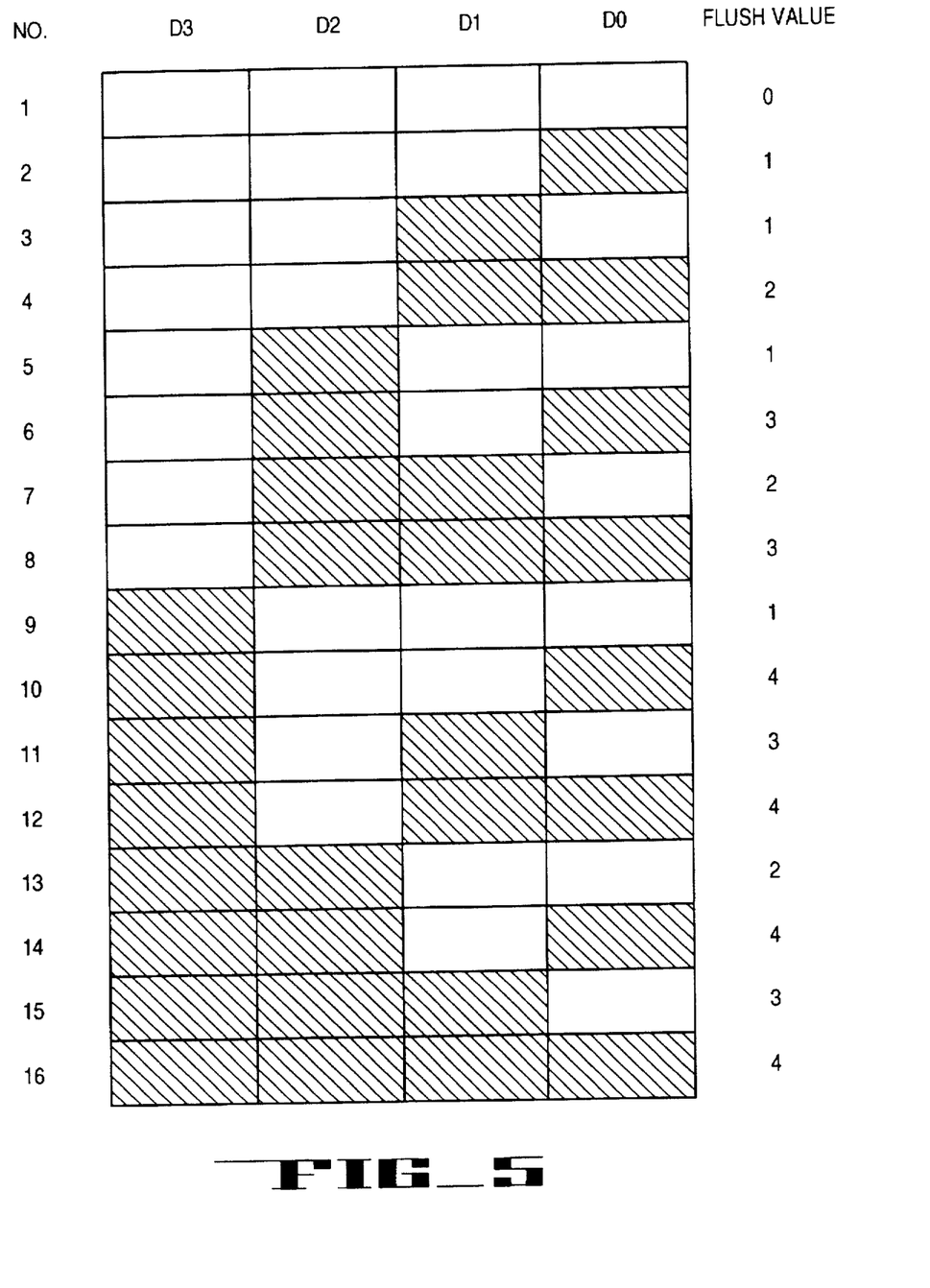
FIG. 5 illustrates different patterns of data which may be stored in a buffer in the bridge illustrated in FIG. 2.

All of the possible patterns of storage are illustrated in FIG. 5 and are numbered at the left in that figure. As may be seen, in a first pattern, no data is stored in the particular line buffer illustrated. In a second pattern, data is stored only in the first (D0) double word position in the individual one of the line buffers 33 being illustrated. In a third pattern, on the other hand, data is stored only in the second (D1) double word position of the individual one of the line buffers 33 being illustrated. In a fourth pattern, on the other hand, data is stored in both the first (D0) and the second (D1) double word positions of one of the line buffers 33 being illustrated. The other patterns illustrated in FIG. 5 are the other possible patterns in which data may be stored in one of the line buffers 33.

As has been discussed above, it is desirable to optimize the transfer of data to the PCI bus 12 using the bridge 17 so that the PCI and the secondary buses which it joins do not become bottlenecks to the transfer of data. It would, of course, be possible to transfer data a doubleword at a time from the line buffers 33 to the PCI bus 12. In order to accomplish this for each transfer it would be necessary for the bridge 17 to arbitrate as a bus master for access to the PCI bus 12. This arbitration, as is known to those skilled in the art, delays the transfer of data to some extent depending on other traffic on the bus 12, the speed of transfer, and other criteria. In addition, because of the protocol of the PCI bus 12, it is necessary for circuitry in the PCI interface to know how much data is being transferred so that a signal may be terminated one clock period before a last transfer of data is completed. This requires that a counter (the counter 55 in the line buffer transfer request circuit 60 of FIG. 4) be reset before each transfer, a step requiring some additional time. Moreover, with each transfer of data it is necessary that the starting address of the data being transferred be sent with the data. This requires that the address stored with the data be properly incremented to the appropriate address for the next double word being transferred.

As may be seen, each of these operations requires some additional time and lengthens the period required to transfer data using the buffers. The time for the transfer is increased even further if, because of the speed of the transfer, no line buffer is available to accept data being transferred by the bus master on the secondary bus and that transfer must be delayed.

For this reason, data is typically not flushed from a line buffer and transferred to its ultimate destination until a buffer has been filled. In order to maintain data coherency, a line buffer should also be flushed whenever the highest doubleword space (D3 in FIGS. 5 and 6) of any such buffer is filled, whenever a transfer through the line buffers 33 ceases in favor of a transfer through the direct path 32 or vice versa, whenever the ownership of the secondary bus 18 changes, whenever an interrupt is encountered necessitating a flush, and whenever a write access by a secondary bus master encounters a write miss.

The condition of a filled buffer is measured in one embodiment by determining when the last doubleword (D3) of the particular line buffer being filled has been filled. When this occurs, whatever data is in the buffer is flushed and transferred as a group to the PCI bus 12. If the buffer is full and all four double words are transferred at once, only one arbitration for the PCI bus is necessary, the counter 55 need only be set one time for up to four doublewords of data, and the address need be set only once for up to four doublewords of data in the particular line buffer. This optimizes the time required for the transfer by averaging the arbitration, counter reset, and address computation time over up to four doublewords of data.

The present invention utilizes a unique property of the circuitry of the bridge 17 in order to allow transfers of data from the line buffers 33 to the PCI bus 12 in groups of multiple doublewords. In order to allow the filling of the line buffers 33 in increments of data equal to a byte, the circuitry of the bridge 17 includes a resister 68 as a part of the line buffer control circuits 57 which stores a bit for each byte of any of the line buffers 33 which may receive data. In one embodiment, the bit is set to a "zero" if data is stored in that particular byte while the bit is set to a "one" value if no data is stored in the particular byte of an individual one of the line buffers 33. This facility allows a bus master to load a line buffer one byte at a time for transfer to the bus 12. This facility is utilized in accordance with the present invention to mark the four bytes which are empty in any unused doubleword so that a group of doublewords (from one to four) may be transferred at once no matter which doublewords actually include data.

In one embodiment, data is transferred from one of the line buffers 33 with an address including information indicating the starting doubleword being transferred, and the length of the data. Thus, for data stored as illustrated in the sixth line of FIG. 5, the starting doubleword would be indicated as doubleword D0 and the flush value length stored as the count in the counter 55 as three doublewords.

Along with this data is transferred byte-validity-indicating data referred to above including the invalid indications for the bytes of the second doubleword of the buffer. This byte-validity-indicating data will include "ones" for each of the four bytes of the second doubleword D1 so that the PCI bus interface circuitry is aware that whatever data is included in each of the byte positions of the second doubleword D1 is invalid.

As will be seen, this same arrangement may be utilized for transferring data in any of the other possible storage conditions illustrated in FIG. 5 of one of the line buffers 33. For example, the data transferred from one of the line buffers 33 in the condition illustrated in the tenth line of FIG. 3 will be defined by an address indicating a starting position at doubleword (D0), a flush value length of four from the counter 55 indicating that all four doublewords are to be transferred, and "one" values for each of the byte positions of the second (D1) and third (D2) doublewords. In a like manner, the data stored in a buffer in the pattern indicated in line 11 of FIG. 5 is indicated by an address defining a starting position of doubleword (D1), a flush value length of three indicating that three doublewords are to be transferred, and "one" values for each of the byte positions of the third (D2) doubleword.

In order to better understand the operation of the present invention, the block diagram of FIG. 4 should be considered. When a secondary bus master gains access to the secondary bus after a bus arbitration in order to transfer data to or from the PCI bus, the bus master first asserts an address on the bus 18. Shortly thereafter, the bus master asserts control signals indicating that the operation is to start, whether the operation is a read or a write operation, and whether the operation is an input/output cycle or a memory cycle. This information is transferred to a secondary bus address decoder residing in the secondary interface of the PCEB chip 24 which determines whether the bridge 17 is the secondary bus slave which is being addressed. The decoder determines that it is the recipient of the data and that it should be a transfer with the PCI bus.

The logic circuitry of the secondary bus interface ascertains from the internal bus controller 54 whether it should continue the operation or whether it should issue a wait signal to the secondary bus master. To accomplish this, the internal bus controller 54 transfers the address to the address comparator 58 which determines whether space is available in the line buffers 33. The address comparator 58 compares the twenty-eight most significant bits of the address with the current address held by the line buffers 33. The line buffer 33 which is currently in use is pointed to by the sequencer 59. After each secondary bus ownership change, the line buffers 33 are emptied, so at the beginning of any new transfer, the line buffer sequencer 59 signals 0 to the address comparator 58 that line buffer is the current address. The address comparator 58 looks for a match with the current address in the address line buffer. Although it does not see a match since no address is held in the line buffers 33, it does receive signals from the line buffer control circuit indicating that the line buffers 33 are empty, so it indicates to the internal bus controller 54 that a hit has occurred. The hit indication allows the internal bus controller to signal the secondary bus interface that it should continue the transfer. At anytime that all of the line buffers are full, the address comparator 58 and the line buffer sequencer 59 cooperate to cause the address comparator 58 to send an indication to the internal bus controller 54 that the bus master must wait on the secondary bus.

The address comparator 58, when it has an initial hit for empty line buffers 33, uses the current buffer furnished by the line buffer sequencer 59 to indicate to the line buffer control circuit that line buffer 0 is to store the data. The signal indicating line buffer 0 is sent to the line buffer control circuit 57 where it activates a line buffer latch state machine LB0. There are four line buffer latch state machine of this type in the line buffer control circuit 57, one for each of the individual line buffers 3:0. The state machine LB0 causes the address on the secondary bus to be latched into the associated address line buffer 0 at the data doubleword space indicated by the two bits (3:2) of the latched address. The state machine LB0 then controls the transfer of data (which by this time appears on the data bus 18) to the doubleword space of the first line buffer 0 indicated by the bits 3:2 of the latched address.

Presuming that a second doubleword at a sequential address is next to be transferred, the address is presented to the internal bus controller 54 and then to the address comparator 58. The address comparator 58 compares the most significant bits of this address with the current address in the current line buffer (as pointed to by the sequencer 59) and signals a hit to the sequencer 59 and to the internal bus controller 54 as long as the next doubleword space in line buffer 0 is empty. The address comparator 58 furnishes the hit indication and the current line buffer to the line buffer control circuit 57. The state machine LB0 then attends to storing the second doubleword of data in the next doubleword space of the first line buffer 0 as indicated by the bits 3:2 of the address.

This operation continues with sequential addresses until the first line buffer is full. During each transfer operation by which data is stored in a particular line buffer 33 starting at a particular address, the signals described are sent to the state machine LB3:0 of the line buffer control circuit 57. The state machine records those doublewords containing valid data. As will be seen, these recorded conditions are used to transfer binary signals to the line buffer transfer request circuit 60 for setting its counter circuit 55 when a flush occurs in order to indicate the number of doublewords in the particular line buffer beginning at the first address in the particular line buffer. A discussion of the line buffer latch state machines in the line buffer control circuit 57 which control the operation of the line buffers will illustrate how these conditions are made available to the circuit 60.

When the particular line buffer is filled as indicated by the highest order doubleword position being filled and the next sequential address is presented on the address bus of the secondary bus 18, the address comparator 58 compares the highest order address bits with address in the current line buffer pointed to by the sequencer 59. The address comparator 58 compares the address in the line buffer and determines an address mismatch has occurred. The address comparator 58 sends the mismatch indication to the sequencer 59, and the line buffer sequencer 59 responds by resetting its current address to the next available line buffer 1. The address comparator 58 then compares the address in this new line buffer, finds all the line buffers to be empty, and indicates a hit at this new line buffer address to the line buffer control circuit 57. The signal is transferred to the line buffer LB1 latch state machine which controls the transfer of the new data to the first doubleword space of the new line buffer 1.

Simultaneously, when the line buffer 0 is filled, the line buffer control circuit 57 signals to the internal bus controller 54 that the buffer is full. The internal bus controller 54 signals the PCI interface that line buffer 0 has data which is ready to be transferred to the PCI interface. The arbiter of the PCI interface then arbitrates for the PCI bus 12. When the PCI bus is acquired, the PCI interface signals the line buffer control circuit 57 and receives back from the line buffer control circuit 57 the starting address for the data to be transferred. This includes the actual address of the line buffer plus the least significant bits which indicate the starting doubleword address. The line buffer control circuit 57 also transfers signals to the PCI interface indicating the valid and invalid byte positions of data in the line buffer 0 so that the data at any unfilled doubleword is ignored in the transfer by the PCI slave on the PCI bus. Simultaneously, the line buffer transfer request circuit 60 transfers to the PCI interface signals indicating how many doublewords are to be transferred beginning at the starting address provided for the transfer from the particular line buffer.

Once this information has been transferred to the PCI interface, the PCI interface begins transferring the data in the line buffer to its internal data buffers and then to the PCI bus. Since the PCI interface knows the number of doublewords involved in the flushing operation, it knows when the operation will be completed. One clock period before this occurs, the PCI interface signals that it is about to relinquish the PCI bus 12. When the flush is complete, the PCI interface as a PCI bus master relinquishes the PCI bus for arbitration. This allows other bus masters on the PCI bus to acquire access on the PCI before a next line buffer flush. However, if no other PCI bus master is requesting the PCI bus, then the PCI interface will probably continue with a next flush operation.

If at any time the PCI interface is unable to acquire the PCI bus, then the individual line buffers 33 will continue to fill. Ultimately, the internal bus control circuit might have to signal the secondary bus master that it must wait on the secondary bus. However, this is statistically very unlikely to occur because of the high priority of the bridge 17 on the PCI bus and the speed of transfers to the PCI bus when transfers occur in groups of multiple doublewords.

If all four line buffers are full, the address comparator when presented a new address for data to be transferred, compares the address to the current address, and generates a miss signal. The miss signal causes the sequencer 59 to sequence its pointer to the next line buffer which should become empty (i.e., LB0). Since the address comparator 58 receives signals from the line buffer control circuit 57 indicating that this buffer is full, the miss signal is transferred to the internal bus controller 54 which causes the secondary bus interface to generate a wait signal to the secondary bus master.

As will be recognized by those skilled in the art, the method of transfer described herein allows data to be transferred to the PCI bus 12 from a bus master on the secondary bus in bursts of up to four doublewords at a time. This allows the efficient use of the PCI bus 12. It reduces the number of arbitrations required to a single arbitration for a group of multiple doublewords of data, reducing the need to recompute addresses and counter values at the same time. By transferring data as soon as a single one of the four line buffers 33 is full, the arrangement assures that other buffers 33 are available in most cases to store additional data being provided by the secondary bus master. On the other hand, the present invention also allows the accumulation of lesser amounts of data being transferred by the secondary bus master so that no interruption of activities on the PCI bus need occur until a substantial amount of data has accumulated. This allows the bus master to function at its normal rate over a relatively long period before the transfer occurs.

Figure 7A:
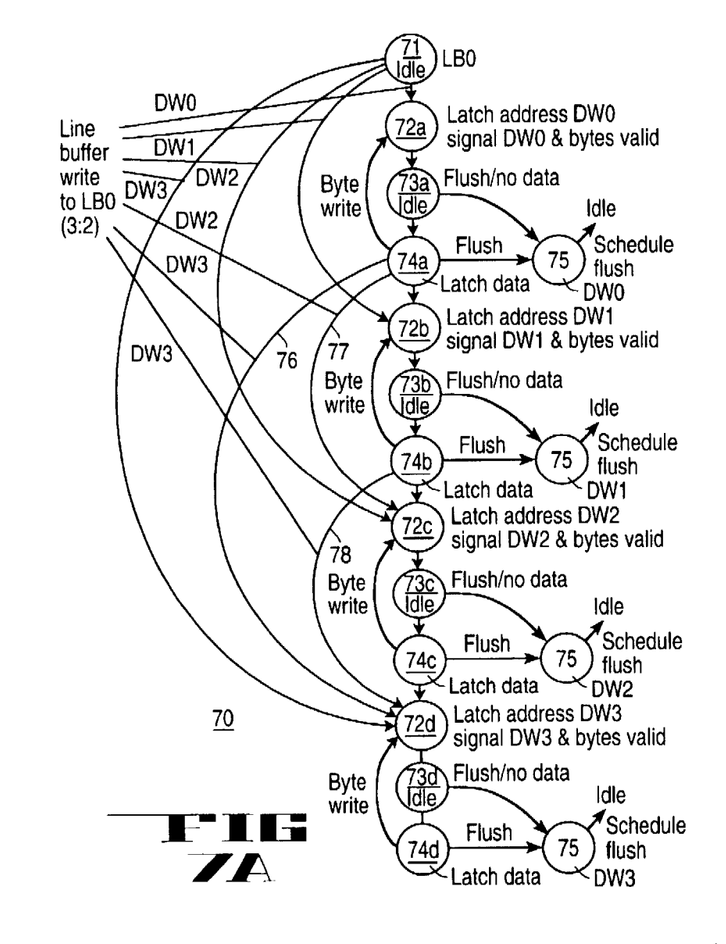
FIGS. 7a and 7b are state diagrams illustrating the operation of particular portions of the line buffer control circuitry used in the present invention.
Figure 7B:
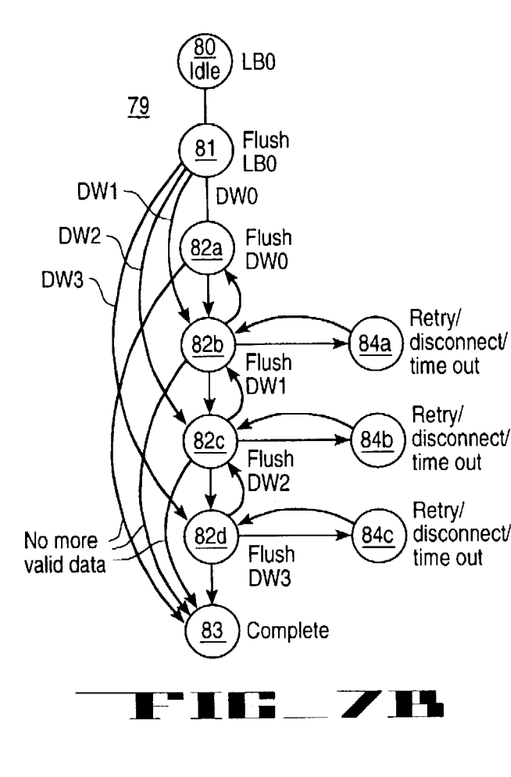

FIGS. 7a and 7b illustrate a pair of state machines 70 and 79 which reside in the line buffer control circuitry. FIG. 7a is a diagram of a first line buffer latch state machine 70 for storing and controlling the condition of one of the line buffers [3:0] so that a flush in accordance with the present invention may be accomplished. The state machine 70 illustrated is replicated for each of the individual line buffers 33 as described above. As may be seen, prior to use, the line buffer latch state machine 70 resides in a first idle state 71. The state machine 70 moves from this idle state in response to signals indicating a line buffer write cycle from a secondary bus master and that there has been an address comparison match for that particular line buffer 3:0. Thus, for line buffer latch state machine 70 to be activated, the address match must be to line buffer 0. The state machine 70 may move to any of four possible states 72a–d each indicating an address at a different doubleword within the line buffer depending on the bits 3:2 of the address being latched. In this state, the most significant twenty-eight bits of the address of the particular doubleword provided on the bus 18 are latched, the state machine 70 marks which of the bytes of the doubleword are valid, and the state machine asserts a signal that the particular doubleword is valid. If any condition requiring a flush has been received, the state machine also marks the line buffer as "do not touch." For any flush which is not asynchronous, this allows only data to be furnished corresponding to the doubleword address just latched. For a flush generated by asynchronous interrupt, the state machine 70 also asserts a signal indicating that this buffer is not to be touched and is part of a snapshot window which must be flushed before the interrupt may be completed.

When the address has been latched, the state machine moves to a next idle state 73a–d waiting the latching of the data for the doubleword. If data arrives without having received a flush signal, the machine moves to state 74a–d in which the data is latched for the particular doubleword. If the data arrives and a flush signal has occurred before or while in state 73a–d, the state machine moves to a state 75. The machine also moves to state 75 from the states 74a–d if a flush occurs during the latching of data in state 74a–d. Moving to the state 75 from the state 73a–d provides for the situation in which a flush occurs after the address has been latched but before data has been received. The state machine 70 proceeds to latch the data into the particular doubleword before flushing is allowed. In this manner, a buffer fill which is incomplete at the time of receipt of the flush signal will be completed so that the data may be sent to its final address before next operation is allowed.

If the machine moves to the state 75 from the state 73a–d, the machine 70 latches the data, and if it has not done so already marks the line buffer (e.g., LB0) as do not touch. In state 75, the state machine issues a signal initiating a flush. In the case of an asynchronous interrupt generated flush, the state machine 75 also generates a signal indicating that this line buffer is part of a snap-shot window which must be acknowledged and serviced.

The state machine proceeds in the same manner from each state 74a–c to the next state 72b–d in response to the next address hit for a particular doubleword as indicated by the bits 3:2 of the address on the bus 18. As may be seen, provision is made for non-sequential loads of the line buffers in the state machine. For example, paths 76, 77, and 78 lead to states at which data is stored in doublewords 2 or 3 instead of the next sequential doubleword. From the states 72b–d, the state machine 70 proceeds through each of its states in the manner described above presuming that no flush signal is received as a line buffer is filled sequentially. If a flush signal is received at any point in the process, the state machine proceeds to the state 75 in the manner described above. Ultimately, a state 74d, the state machine automatically moves to state 75 and generates a flush signal when the line buffer is full. It should also be noted that a path is provided from each state 74a–d back to the associated state 72a–d after data is latched so that the next byte of a doubleword may be latched in a situation in which data is being assembled byte by byte on the secondary bus.

At any time at which a flush signal is received, the state machine moves to the state 75 at which the flush operation is scheduled. In response to scheduling a flush, a binary signal is generated by the line buffer control circuit 57 (in response to the conditions generated at state 75) representing the number of buffer doublewords beginning with the first double-word in the line buffer which contains valid data to be flushed through the last doubleword containing valid data to be flushed. This binary signal is transferred to the line buffer transfer request circuit 60 to set the counter to the correct number of doublewords for the flush operation. Once a flush commences, the state 75 indicates that the particular line buffer should not be further touched by the secondary bus master. The signal which precludes further use of that buffer allows the secondary bus master to continue to fill other buffers than those in use at the time the interrupt was asserted but lets no additional data be stored in the buffers being flushed.

FIG. 7b is a diagram illustrating the states of a state machine 79 used for flushing the line buffers. The state machine 79 resides in the line buffer control circuitry of the PCEB chip 24. The diagram illustrates a state machine 79 for only one of the four line buffers 33. This state machine is also replicated for each of the line buffers [3:0]. The diagram shows a first idle state 80 in which the state machine 79 normally resides. When a flush is scheduled of the associated one of the line buffers 33 and particularly of the line buffer 0 illustrated, the state machine 79 moves to a state 81. If the line buffer 0 is scheduled to be flushed, if the cycle is a PCI destination cycle, if doubleword 0 is occupied as indicated by the valid data signals generated at states 72a–d of the state machine 70 of FIG. 7a, then the state machine moves to a state 82a. If the doubleword 0 is not occupied by valid data, the state machine 79 moves to the state 82b if doubleword 1 is the first doubleword containing valid data, to the state 82c if doubleword 2 is the first doubleword containing valid data, or to the state 82d if doubleword 3 is the first doubleword containing valid data. The data in the selected doubleword is flushed, and the state machine 79 moves from the particular state 82a–d to the next state 82a–d if valid data in any succeeding doubleword of that line buffer. The state machine 79 circulates through the various states in the manner described until all of the doubleword storage positions between the first doubleword holding valid data and the last doubleword holding valid data have been flushed. It should be noted that the state machine moves to a state 84 whenever a retry, disconnect, or time out situation is encountered on the PCI bus 12. Ultimately, the state machine 79 moves to a state 83 in which the particular line buffer has been flushed.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A bridge circuit adapted to be associated with a first bus and a second bus which bridge circuit comprises:

a path adapted to transfer data between the first and the second buses, the path including a buffer adapted to store a plurality of increments of data each data increment being destined for a corresponding set of sequential addresses, there being at least one empty address among the addresses corresponding to the plurality of data increments, there being no valid data stored in the buffer corresponding to the empty address;

an apparatus adapted to store the increments of data in the buffer, each data increment and its corresponding address set being provided via the second bus;

an apparatus adapted to detect when the data increments in the buffer are to be transferred to the first bus; and an apparatus adapted to flush to the first bus, using only one arbitrate/acquire/relinquish cycle on the first bus, both an indication of the empty address and all data increments in the buffer.

2. A bridge circuit as claimed in claim 1 in which the flushing apparatus comprises:

circuitry adapted to arbitrate for and acquire the first bus, and to subsequently relinquish the first bus;

circuitry adapted to provide to the first bus, after the acquisition and before the next relinquishment thereof, an indication of a first address corresponding to the start of a first data increment in the buffer;

circuitry adapted to provide to the first bus, after the acquisition and before the next relinquishment thereof, an indication of a number of addresses between the first address and a last address, the last address corresponding to the end of a last increment in the buffer;

circuitry adapted to provide to the first bus, after the acquisition and before the next relinquishment thereof, an indication of the empty address; and circuitry adapted to provide to the first bus, after the acquisition and before the next relinquishment thereof, all data increments in the buffer.

3. A bridge circuit as claimed in claim 2 in which the number indication is generated by a counter for counting the number of addresses between the first and the last address.

4. A bridge circuit as claimed in claim 2 in which the validity indication is generated by a register that stores data indicating the validity of bytes of data stored in the buffer.

5. In a bridge circuit for transferring data from a source bus to a destination bus, the bridge circuit including a buffer that stores information being transferred between the buses, the buffer being capable of storing information directed to a plurality of addresses; a circuit for controlling flushing the buffers comprising:

circuitry adapted to arbitrate for and acquire the destination bus, and to subsequently relinquish the first bus;

an apparatus adapted to signal on the destination bus, after the acquisition and before the next relinquishment thereof, a beginning address that corresponds to information stored in one of the plurality of buffers;

an apparatus adapted to signal on the destination bus, after the acquisition and before the next relinquishment thereof, the number of sequential addresses from which information is to be transferred; and an apparatus adapted to signal on the destination bus, after the acquisition and before the next relinquishment thereof, which of the sequential addresses contain no information.

6. In a bridge circuit as claimed in claim 5, the number signaling apparatus comprising a counter of the number of addresses in the buffer between a beginning address and an ending address.

7. In a bridge circuit as claimed in claim 5,
the information signaling apparatus comprising a register adapted to store data indicating the validity of information at individual addresses.

8. In a bridge circuit as claimed in claim 7, wherein the individual addresses correspond to bytes of the information.

9. A computer system comprising:
a processor;
a main memory;
a first bus;
a second bus;
a bridge circuit adapted to transfer information between the first and the second bus having
  a buffer adapted to store information being transferred between the buses, the buffer being capable of storing information directed to a plurality of addresses,
  a circuit adapted to transfer the information to the buffer from one of the buses, and
  a circuit adapted to flush all the information from the buffer to the other bus comprising:
    circuitry adapted to arbitrate for and acquire the other bus, and to subsequently relinquish the other bus;
    a first apparatus adapted to signal on the other bus, after the acquisition and before the next relinquishment thereof, a beginning address for which information is to be transferred;
    a second apparatus adapted to signal on the other bus, after the acquisition and before the next relinquishment thereof, the number of sequential addresses after the beginning address for which information is to be transferred; and
    a third apparatus adapted to signal on the other bus, after the acquisition and before the next relinquishment thereof, which of the sequential addresses contain no information.

10. A computer system as claimed in claim 9 in which the second apparatus comprises a counter of the number of addresses in the buffer between a beginning address and an ending address.

11. A computer system as claimed in claim 9 in which the third apparatus comprises a register adapted to store data indicating the validity of information at individual addresses.

12. A computer system comprising:
a central processor;
main memory;
a first bus;
a second bus; and
a bridge circuit adapted to transfer information between the first and the second buses, the bridge circuit comprising:
  a path adapted to transfer data between the first and the second buses, the path including a buffer adapted to store a plurality of increments of data each data increment being destined for a corresponding set of sequential addresses, there being at least one empty address among the addresses corresponding to the plurality of data increments, there being no valid data stored in the buffer corresponding to the empty address;
  an apparatus adapted to store the increments of data in the buffer, each data increment and its corresponding address set being provided via one of the buses;
  an apparatus adapted to detect when the data increments in the buffer are to be transferred to one of the buses; and
  an apparatus adapted to flush to one of the buses, using only one arbitrate/acquire/relinquish cycle on that bus, both an indication of the empty address and all data increments in the buffer.

13. A computer system as claimed in claim 12 in which the flushing apparatus comprises:
  circuitry adapted to arbitrate for and acquire the first bus, and to subsequently relinquish the first bus;
  circuitry adapted to provide to the first bus, after the acquisition and before the next relinquishment thereof, an indication of a first address corresponding to the start of a first data increment in the buffer;
  circuitry adapted to provide to the first bus, after the acquisition and before the next relinquishment thereof, an indication of a number of addresses between the first address and a last address, the last address corresponding to the end of a last increment in the buffer; and
  circuitry adapted to provide to the first bus, after the acquisition and before the next relinquishment thereof, an indication of the empty address; and
  circuitry adapted to provide to the first bus, after the acquisition and before the next relinquishment thereof, all data increments in the buffer.

14. A computer system as claimed in claim 13 in which the number indication is generated by a counter for counting the number of addresses between the first and the last address of the data increments stored in the buffer.

15. A computer system as claimed in claim 13 in which the validity indication is generated by a register that stores data indicating the validity of bytes of data stored in the buffer.

16. A method for flushing a buffer adapted to store data being transferred from a source bus to a destination bus, the data comprising a plurality of data increments, the method comprising:
detecting a flush signal;
arbitrating for and acquiring the destination bus, and subsequently relinquishing the same;
providing to the destination bus, after the acquisition and before the next relinquishment thereof, a beginning address corresponding to the beginning of a first data increment stored in the buffer;
providing to the destination bus, after the acquisition and before the next relinquishment thereof, a transfer length, the transfer length extending from the beginning address to an end address of the last data increment within the buffer;
providing to the destination bus, after the acquisition and before the next relinquishment thereof, an indication of the length and location of an empty section within the buffer between the beginning address and the end address, the empty section occurring between the data increments; and
providing to the destination bus, after the acquisition and before the next relinquishment thereof, all data increments stored in the buffer.

17. A method for flushing a buffer as claimed in claim 16 in which the step of detecting a flush signal occurs whenever the highest addressed space for data in the buffer is filled.

18. A method for flushing a buffer as claimed in claim 16 in which the step of detecting a flush signal occurs whenever a transfer through the plurality of line buffers ceases in favor of a transfer through a direct path between the buses.

19. A method for flushing a buffer as claimed in claim 16 in which the step of detecting a flush signal occurs whenever the address of a data increment received by the buffer from the source bus misses the addresses available for data in the buffer.

20. A method for flushing a buffer as claimed in claim 16 in which the step of detecting a flush signal occurs whenever the ownership of one of the buses changes.

21. A bridge circuit as claimed in claim 1 further comprising:

- at least one additional buffer within said data transfer path, each additional buffer being adapted to store a plurality of increments of data each destined for a corresponding set of addresses, there being at least one empty address among said sets of addresses;
- a buffer sequencer adapted to select from among the buffer and the additional buffers which one is to receive the data increments from the second bus;
- an apparatus adapted to detect when the data increments in each additional buffer are to be transferred to the first bus; and
- an apparatus adapted to flush to the first bus, using only one arbitrate/acquire/relinquish cycle on the first bus, all data increments in any one of the additional buffers.

22. A computer system as claimed in claim 12, in which the bridge circuit further comprises:

- at least one additional buffer within the data transfer path, each additional buffer being adapted to store a plurality of increments of data each data increment being destined for a corresponding set of sequential addresses, there being at least one empty address among the addresses corresponding to the plurality of data increments, there being no valid data stored in the buffer corresponding to the empty address;
- a buffer sequencer adapted to select from among the buffer and the additional buffers which one is to receive the data increments from one of the buses;
- an apparatus adapted to detect when the data increments in each additional buffer are to be transferred to one of the buses; and
- an apparatus adapted to flush to one of the buses, using only one arbitrate/acquire/relinquish cycle on that bus, both an indication of the empty address and all data increments in any one of the additional buffers.

23. A method for flushing a buffer as claimed in claim 16 in which the step of detecting a flush signal occurs whenever the most significant bits of the address of a data increment received by the buffer from the source bus does not compare with the current buffer address.

* * * * *